(No Model.)

J. F. FULKERSON.
FENCE.

No. 441,546. Patented Nov. 25, 1890.

WITNESSES
C. C. Burdine
Mayo Vicke

James F. Fulkerson
INVENTOR

W. T. Fitzgerald
his Attorney

UNITED STATES PATENT OFFICE.

JAMES F. FULKERSON, OF RAUM, ILLINOIS.

FENCE.

SPECIFICATION forming part of Letters Patent No. 441,546, dated November 25, 1890.

Application filed September 26, 1889. Serial No. 325,146. (No model.)

*To all whom it may concern:*

Be it known that I, JAMES F. FULKERSON, a citizen of the United States, residing at Raum, in the county of Pope and State of Illinois, have invented certain new and useful Improvements in Fences; and I do hereby declare the following to be a full, clear, and exact description of the invention, such as will enable others skilled in the art to which it appertains to make and use the same.

This invention relates to improvements in fences, and more especially to what is generally known as a "farm-fence," the object of the invention being the production of a fence which can be quickly built of rails and wire, which will resist the damaging influences of the wind, and which will be cheap and effective, thus combining all the essentials in a fence of this character.

The invention consists of a fence constructed substantially as herein illustrated, described, and specifically claimed.

Figure 1:
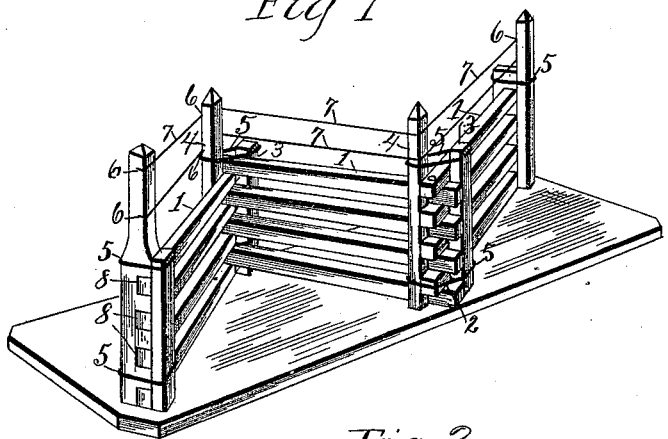
Figure 2:
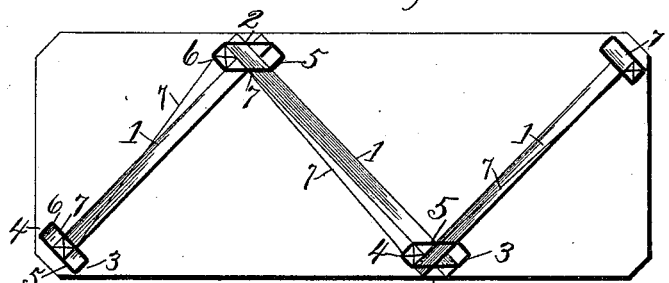
Figure 3:
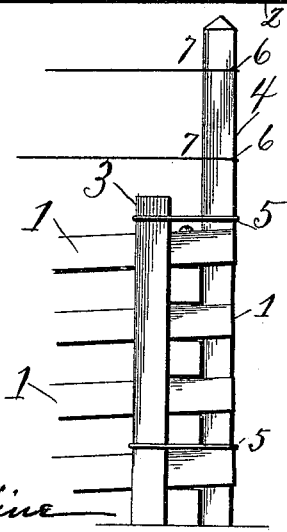

Figure 1 represents a perspective view of a fence constructed in accordance with and embodying my invention. Fig. 2 represents a plan view thereof. Fig. 3 represents a detail view to illustrate more clearly the manner of securing the end posts and rails.

Referring by numerals to the drawings, the numeral 1 designates the rails of my fence, which are arranged in a zigzag or reverse direction to each other and have their ends crossed, as shown, forming the recesses or notches 2. In the notches 2 are placed the posts 3 and 4, which are secured in the proper position by means of binding wires or loops 5, passing around the posts near the upper and lower ends. The posts 4 are longer than posts 3, or are formed with the upper extended ends, and in said ends on opposite sides of alternate posts are placed staples or eyes 6 to receive the wires 7, which form a barrier above the rails and make the fence of sufficient height to prevent animals from scaling it, as is evident. In addition to forming a barrier, these wires serve the purpose of strengthening the fence—that is to say, if an animal comes to a fence of this construction to get over he naturally goes into an angle as far as possible and there pushes against the rails and post. Such force might cause the lapping ends of the rails 1 to slip on each other until they move from between the posts 3 and 4, even though the latter were connected by the loops 5; but by stretching the wires 7 and passing outside the upper ends of one or both posts at each angle such outward movement of the posts is avoided, and hence the outward slipping of the rails is rendered impossible. The inward slipping of the rails is prevented by the binding of the loops.

At the ends of the fence I prefer to use posts having recesses or notches 8 to receive the ends of the rails, and secure the loops in the same manner as before.

It will thus be seen that I provide a cheap and durable farm-fence which will effectually serve the purpose for which it is intended.

I claim as my invention, and desire to secure by Letters Patent—

The herein-described fence, the same comprising zigzag panels of rails 1, with their ends crossing those of the adjacent panels, vertical posts 3 and 4 in the longitudinal angles of each crossing, the posts 4 rising above the upper rail, loops 5, connecting each pair of posts near the top and bottom of the fence, and taut wires 7, extending the length of the fence and passing outside the upper end of each longer post 4, all as and for the purpose set forth.

In testimony whereof I affix my signature in presence of two witnesses.

JAMES F. FULKERSON.

Witnesses:
  JOHN B. HART,
  J. C. SMITH.